(12) United States Patent
LeVesque et al.

(10) Patent No.: US 6,420,800 B1
(45) Date of Patent: Jul. 16, 2002

(54) REARVIEW MIRROR WITH BUTTONS INCORPORATING DISPLAY

(75) Inventors: Andrew J. LeVesque, Holland; John K. Roberts, E. Grand Rapids, both of MI (US)

(73) Assignee: Gentex Corporation, Zeeland, MI (US)

( * ) Notice: Subject to any disclaimer, the term of this patent is extended or adjusted under 35 U.S.C. 154(b) by 102 days.

(21) Appl. No.: 09/632,470

(22) Filed: Aug. 4, 2000

Related U.S. Application Data

(63) Continuation-in-part of application No. 09/579,102, filed on May 25, 2000.

(51) Int. Cl.⁷ ................................................. H02G 3/00
(52) U.S. Cl. ........................ 307/10.1; 307/9.1; 359/838; 359/839; 362/487; 362/494
(58) Field of Search ................................. 307/9.1, 10.1; 359/838, 839; 362/487, 494

(56) References Cited

U.S. PATENT DOCUMENTS

| | | | |
|---|---|---|---|
| 5,285,060 A | 2/1994 | Larson et al. | |
| 5,576,687 A | 11/1996 | Blank et al. | |
| D391,214 S | 2/1998 | Hook et al. | |
| D402,950 S | 12/1998 | Fitzpatrick | |
| 6,026,162 A | 2/2000 | Palett et al. | |

*Primary Examiner*—Josie Ballato
*Assistant Examiner*—Robert L. Deberadinis
(74) *Attorney, Agent, or Firm*—Brian J. Rees; Price, Heneveld, Cooper, DeWitt & Litton

(57) ABSTRACT

An electrochromic mirror includes a housing, a rearview mirror subassembly including a reflector in the housing, and an electrical circuit with switches adapted to interact with electrical systems in the vehicle. An elongated display area is formed in a face of the housing assembly, either under, aside or above the face. Switch buttons are positioned in the display area for operating switches in the electrical circuit. A compact display is incorporated into a face of the buttons. Specifically, a center region forms a symbol. A border is formed around the center region, and a third region is formed around the border. One of the center region, the border, and the outer region is light-transmissive, and the other two regions contrast in color. A light source is positioned to direct light toward the button face. Each light source is operably connected to the electrical circuit and the electrical circuit is configured to variably energize and de-energize the associated light source when the one switch is activated and de-activated. By this arrangement, the button is visible and identified during daylight and during night with the light source activated or de-activated.

15 Claims, 3 Drawing Sheets

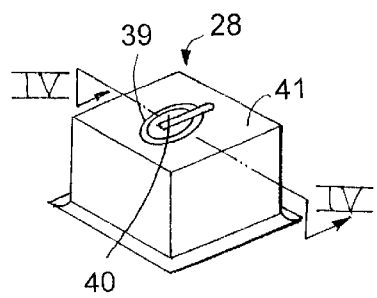
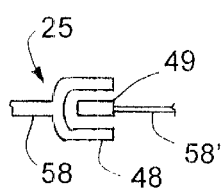
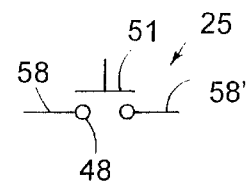
FIG. 3    FIG. 5    FIG. 6
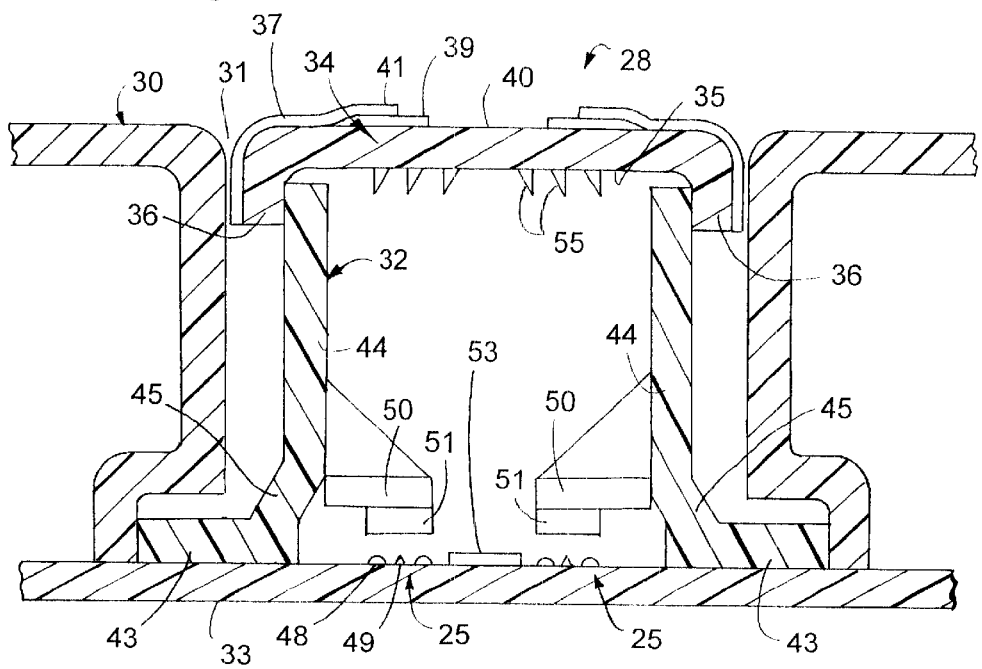
FIG. 4
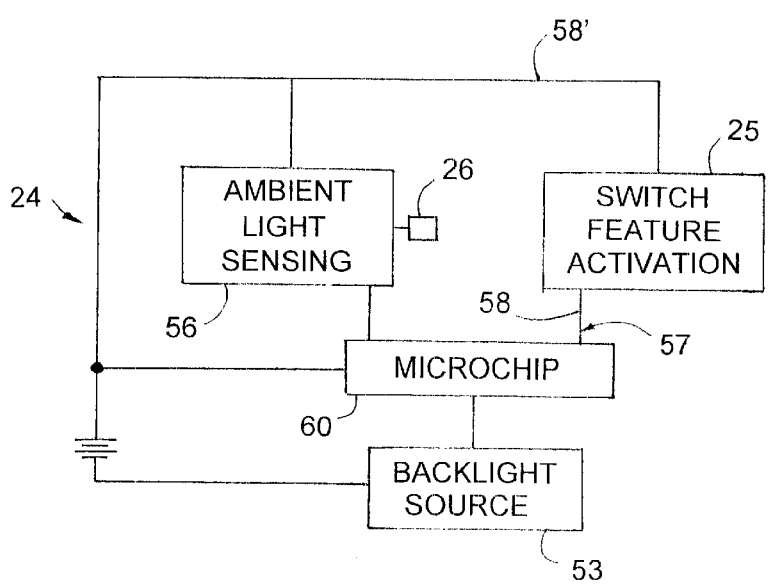
FIG. 7

REARVIEW MIRROR WITH BUTTONS INCORPORATING DISPLAY

CROSS-REFERENCE TO RELATED APPLICATIONS

This is a continuation-in-part of application Ser. No. 09/579,102, filed on May 25, 2000, entitled: REARVIEW MIRROR WITH BUTTONS INCORPORATING DISPLAY, the entire contents of which are incorporated herein by reference.

FIELD OF THE INVENTION

The present invention relates to vehicle rearview mirrors, and more particularly related to the display of information on buttons in a rearview mirror assembly.

BACKGROUND OF THE INVENTION

Rearview mirror assemblies for modern vehicles often include many functions, since they are located in an excellent position in vehicles for viewing, sensing, and touching. Further, miniaturized electronics have made it such that it is not uncommon for an electrochromic mirror assembly to include multiple electrical circuits, controls and sensors for such things as daylight/darkness sensing, auto-darkening of the mirror reflector to reduce glare at night, keyless entry sensing, temperature sensing, compass and directional sensing, microphones, passenger air-bag on/off controls, emergency call and help assistance systems, along with all of the on/off buttons and on/off indicator lights that go along with these systems. A problem is that this results in a very high density of buttons, on/off displays, alphanumerical and lighted identification markings, and the like. It is desirable to place these things on a mirror housing for easy viewing and access, but so that they do not interfere with viewing objects in the rearview mirror. However, the display area under a mirror must be kept to a minimum vertical dimension and minimum total area so that a vehicle driver can see past the mirror out the vehicle front window. The result is a vertically narrow, horizontally elongated display area that extends horizontally along a bottom of the mirror housing that tends to be unacceptably crowded and cluttered with multiple buttons, lights, and indicators. This is particularly true with high-function mirrors where the display area under the mirror can include lights, buttons, and symbols for each function. The density of these lights, buttons, and symbols forces them to be relatively small in size and difficult to identify and touch. Accordingly, a display is desired that incorporates buttons, lighted indicators, and identification symbols, but that both maintains a minimum of size while also maintaining ease of readability and recognition, and that also maintains easy button activation.

Another problem concerns daylight versus nighttime viewing. During the day, bright sunlight may make it difficult to determine if an indicator light is on, especially when the indicator light is small or positioned close to other indicators, or if the indicator light is too dimly lit. Darkness can aggravate the problem. For example, if an indicator that is bright enough to see during the day, it is often uncomfortably bright when viewed at night. At the same time, indicator lights that have a comfortable brightness for viewing at night are usually too dim for viewing during the day. The problem becomes worse when different levels of light are used in an attempt to identify "on" and "off" positions of a button on a single lighted indicator.

Buttons and lighted indicators are often made with face materials that give a "dead front" effect so that a driver cannot see fingerprints on the buttons and so that a driver cannot see into an indicator when the indicator is not lighted. This can make identifying symbols and markings on indicators difficult to read when the indicators are not lighted. This problem is compounded at night during darkness. It is often undesirable or impossible to make identification markings and buttons very large or too brightly colored, due to maximum housing size limitations and minimum reflector sizes allowed by the vehicle manufacturer. Also, large buttons and indicators can look bulky and unrefined, such that they do not fit well into the décor of the vehicle interior.

Aside from the density of displays and problems associated with daytime versus nighttime viewing, the vehicle and mirror manufacturing industries are highly competitive, price and value sensitive, and aesthetically driven. Therefore, any display system that is developed must provide good density of buttons, lighted indicators, and symbolic identification system, yet it must also be inexpensive, cost effective, durable, and relatively easily assembled.

The present invention has been developed in view of the foregoing, and to address other deficiencies of the prior art.

SUMMARY OF THE PRESENT INVENTION

In one aspect of the present invention, a mirror for a vehicle includes a mirror housing, a reflector positioned in the mirror housing, and an electrical circuit having a switch coupled to the mirror housing for activating and de-activating the electrical circuit. A sensor is operably connected to the electrical circuit for sensing daylight and darkness. A compact display on a front of the mirror housing includes a button coupled to the switch to actuate the switch. The button includes a face having a symbol-defining center area, and further having marginal area around the window to define a border, and still further, having outer material forming an outer region outside of the border. The center area and the marginal area both define an identifying symbol for the button. One of the marginal area and the center area has an appearance in daylight that contrasts visibly and noticeably with the outer material. The other of the marginal area and the center area form a light-transmissive window. A light source is positioned to direct light toward the window. The electrical circuit is configured to automatically energize the light source to a first level to allow viewing and identification when in darkness and when the switch has de-activated the circuit, and further is configured to automatically energize the light source to a second level to allow viewing and identification when in darkness and when the switch has activated the circuit, and still further is configured to automatically energize the light source to a third level to allow viewing and identification when in daylight and when the switch has activated the circuit, and also the one of the border and the center area is visible due to contrast to the outer material when in the daylight to allow viewing and identification of the button when the switch has de-activated the circuit.

In another aspect of the present invention, a compact display for a mirror in a vehicle is provided, where the mirror has a mirror housing, a reflector is positioned in the mirror housing, and an electrical circuit includes a switch positioned in or on the housing for activating and de-activating the electrical circuit. A sensor is operably attached to the electrical circuit for sensing daylight and darkness. The display includes a button coupled to the switch to actuate the switch. The button includes a first material in a first area forming a symbol. The button also includes a second material in a second area forming an outline around the symbol, and further, the button also includes a third material in a third area outside of the outline. The third material contrasts visibly with one of the first and second materials for good viewing, even at dusk. The other of the first and second materials is light-transmitting to form a window. A light source is positioned to direct light toward the window. The electrical circuit is configured to automatically energize the light source to a first level when in darkness and when the switch has de-activated the circuit, and further is configured to automatically energize the light source to a second level when in darkness and when the switch has activated the circuit, and still further is configured to automatically energize the light source to a third level when in daylight and when the switch has activated the circuit, and also the border is visible by contrast to at least one of the outer material and the window when in the daylight to identify the button when the switch has de-activated the circuit.

In yet another aspect, a compact apparatus for a vehicle component includes a housing, a switch coupled to the housing, and a button coupled to the switch to actuate the switch. The button includes a face having a first material in a first region in the shape of a symbol, a second material forming a border around the symbol, and still further having a third material in an outer region outside of the border. The first and second materials both define an identifying symbol for the button. One of the first, second and third materials has an appearance in daylight that contrasts visibly with at least one of the other two materials when the window is not lit, and at least one of the other two materials is translucent. An automatically varied light source is positioned in the housing to direct light toward the window. The light source is configured to provide a level of light sufficient for viewing and identification when in darkness and when the switch has de-activated the circuit, and further is configured to provide a level of light sufficient for viewing and identification when in darkness and when the switch has activated the circuit, and still further is configured to provide a level of light sufficient for viewing and identification when in daylight and when the switch has activated the circuit, and also one of the first region and the border is visible when in the daylight to identify the button when the switch has de-activated the circuit.

These and other features, advantages, and aspects of the present invention will be further understood and appreciated by those skilled in the art by reference to the following specification, claims, and appended drawings.

DESCRIPTION OF THE DRAWINGS

FIG. 3 is a perspective view of one of the buttons shown in FIG. 1;

FIG. 4 is a cross section taken along line IV—IV in FIG. 3;

FIG. 5 is a plan view of the stationary portion of the switch shown in FIG. 4;

FIG. 6 is a schematic representation of the switch shown in FIG. 4;

FIG. 7 is a schematic circuit diagram of the electrical circuit for the device shown in FIG. 1.

DETAILED DESCRIPTION OF PREFERRED EMBODIMENTS

Figure 1:
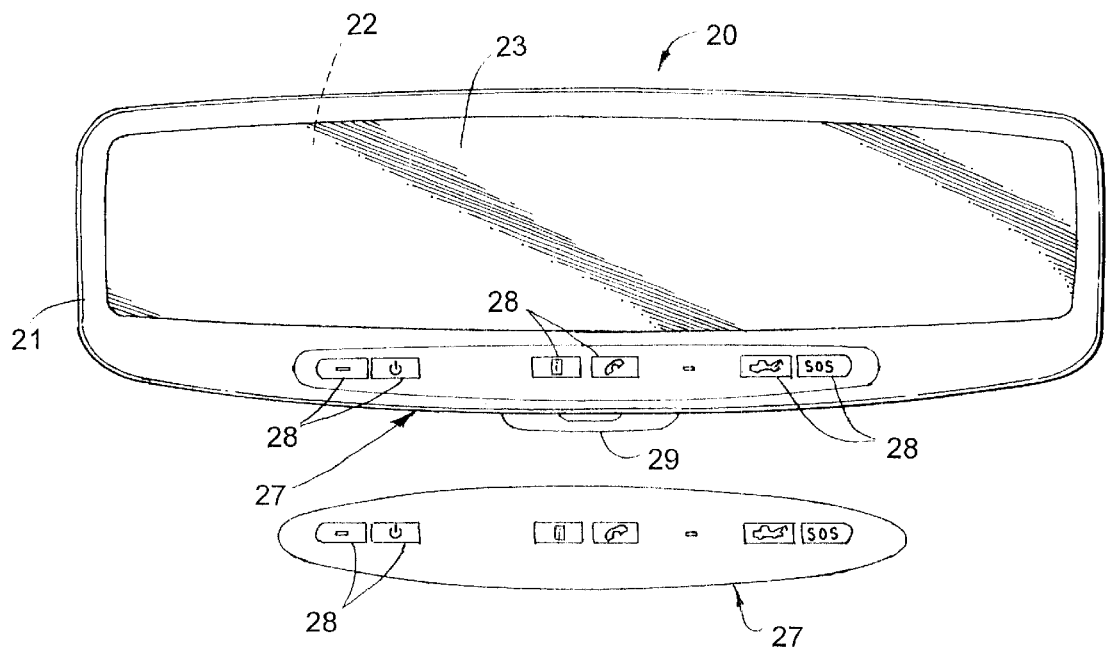
FIG. 1 is a front view of a mirror assembly including a vehicular and display system in accordance with an embodiment of the present invention.
Figure 2:
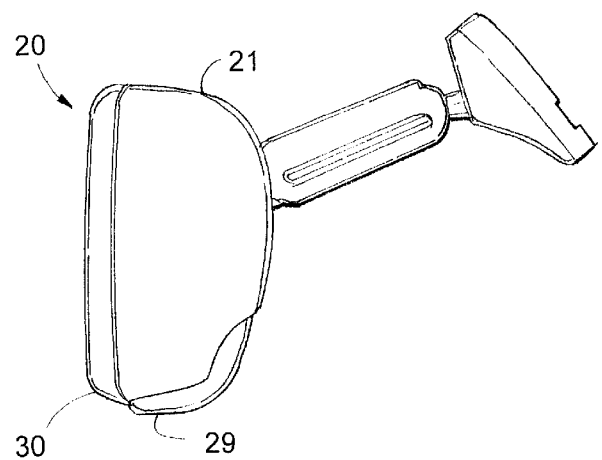
FIG. 2 is a side view of FIG. 1.

A mirror 20 (FIG. 1) embodying the present invention includes a mirror housing 21, a mirror subassembly 22 (such as an electrochromic mirror or a non-electrochromic mirror) having a reflector 23 positioned in or on the mirror housing 21 for reflecting images of objects behind the vehicle, and an electrical circuit 24 (FIG. 7) having switches 25 positioned in the mirror housing 21 for activating and de-activating portions of the electrical circuit 24. The electrical circuit 24 includes a sensor 26 and ambient light sensing circuit portion 56 for sensing daylight and darkness. A compact display 27 (FIG. 1) extends along a bottom (or top or side) of a front of the mirror housing 21 and includes a plurality of buttons 28 coupled to the switches 25 to actuate the circuit portions. The buttons 28 have lighted identifiers integrated into the buttons 28 in a manner that maintains clear identification of the buttons during the daylight and during the darkness of nighttime, yet that also maintain an ability of the buttons 28 to also indicate whether its associated switch has activated or de-activated the associated circuit portion.

The illustrated housing 21 is elongated and generally rectangular, and the display 27 extends horizontally along the reflector 23. FIG. 1 shows the display 27 during daytime, and FIG. 1A is a fragmentary view showing the appearance of the display 27 at nighttime in darkness. A microphone 29 is located under the display in a center area in an optimal location for receiving voice commands from a driver. The microphone 29 can be oriented toward the driver if desired. The illustrated microphone 29 includes an opening for receiving sound waves, but it is noted that differently shaped microphones can be used. The microphone 29 and related circuitry is more fully discussed in co-assigned, co-pending application Ser. No. 09/444,176, filed Nov. 19, 1999, entitled VEHICLE ACCESSORY MICROPHONE, and in co-assigned, co-pending application No. 06/195,509, filed Apr. 6, 2000, ENTITLED VEHICLE REARVIEW MIRROR ASSEMBLY INCORPORATING A COMMUNICATION SYSTEM, the entire contents of both of which are incorporated herein in their entirety by reference.

The button 28 illustrated in FIGS. 3–4 is illustrative of those buttons 28 in FIG. 1 that are lighted and that have the lighted identification arrangement of the present invention. The housing 21 includes a bezel 30 defining a button opening 31 (FIG. 4) for each of the buttons 28, either individually or as sets of buttons 28. The button 28 includes a resilient member 32 mounted on a printed circuit board 33 and a button face member 34. The button face member 34 includes a rigid front panel 35 defining a relatively flat front face, and side flanges 36. The front panel 35 (and potentially all of the button face member 34) is made of a transparent or translucent material that is light-transmissive. A first layer of highly visible material 37, such as a highly reflective amber-colored or fluorescent white paint, is coated on the front face to leave a window 40. (The illustrated visible material 37 is opaque, but it does not need to be so long as it is highly visible and contrasts to the window 40 and/or outer material 41.). The window 40 has the shape of a symbol for identifying the button, such as the shape of a tow truck or a telephone receiver or alphanumeric indicia or the like. A second layer of low reflective material 41 is applied to the button front face in an outer region of the button front face, leaving uncovered a strip portion of the first layer of visible material 37 as a visible border 39 around a perimeter of the window 40. The second layer 41 contrasts with the first layer of visible material 37, making the border 39 easily visible. For example, the second layer 41 can be black and opaque or dull. As a result, both the window 40 by itself and also the border 39 by itself define the symbol.

The resilient member 32 (FIG. 4) includes a foot flange 43 attached to the PC board 33, and a wall section 44 that extends from the foot flange 43. The side flanges 36 of the button face member 34 are attached to the wall section 44. An angled or base portion 45 of the wall section 44 is flexible, and is shaped to flex or roll in a controlled manner when the button face member 34 is depressed. It is noted that the resilient member 32 can be extended to form a part of several buttons 25. Further, the front panel 35 can be insert molded or otherwise secured to the resilient member 32 of the various buttons 28. Also, the front panel 35 can be incorporated into the resilient member 32 as discussed below.

A pair of electrical switches 25 are formed on the PC board 33 under the button 28. Each electrical switch 25 has a U shaped first contact member 48 (FIG. 5) and a second contact member 49 positioned within the U shape. A ledge 50 (FIG. 4) is formed on the wall section 44, and includes an electrically conductive contact pad 51 oriented to engage the contact members 48 and 49 to create a short between contact members 48 and 49 when the button face member 34 is depressed, thus closing the switch. The conductive contact pad 51 can be made by different means. For example, the contact pad 51 can be made by a conductive coating applied to the ledge 50. The two switches 25 on button 28 are redundant, so that the electrical circuit 52 (FIG. 7) is still completed even if the button face member 34 is fully depressed only on one side. The flexible base 45 tends to roll in a manner that tends to keep the face member 34 relatively square when the button 28 is depressed, and further the rolling action provides a good detented feel to the person depressing the button 28. A light source 53 is positioned on the PC board 33 in a central location so that light generated by the light source 53 is directed toward the window 40. The undersurface of the front panel 35 can include prisms 55 or other lens structure, if desired, to better distribute light from the light source 53, but it is noted that light sources can also be selected that provide an adequate distribution of light by themselves.

The circuit 24 (FIG. 7) includes an ambient light sensing circuit portion 56 having a light sensor or photocell capable of sensing daylight. The sensor 26 is preferably in the housing 21, but it may be placed at some other location, if desired, such as in an overhead console or in a dash board. The ambient light sensing circuit portion 56 is operably connected to a microchip or microprocessor 60 programmed to receive data from the light sensor and to determine daylight and darkness. A second circuit portion 57 includes wiring 58 and 58' connected to each of the switches 25 for communicating the condition of the switches 25. The microprocessor 60 is programmed and configured to automatically energize the light source 53 to a first level of brightness (i.e. a relatively dim level) when in darkness and when the associated switch 25 has de-activated the switch circuit, and further is configured to automatically energize the light source 53 to a second level of brightness (i.e. an intermediate level) when in darkness and when the switch 25 has activated the switch circuit, and still further is configured to automatically energize the light source 53 to a third level of brightness (i.e. a relatively bright level easily seen during daylight despite the brightness of the day) when in daylight and when the switch 25 has activated the circuit. Characteristically, the border 39 is sharply visible when in the daylight due to the contrast between contrastingly visible material 37 of the border 39 and darkness of the window 40 and also between the border 39 and the dark material 38 in the outer region. Notably, the present integrated arrangement of the window 40 and the border or outline 39 allows the symbol formed by these items to be much larger than would otherwise be possible. This allows the designer to construct a compact and dense arrangement of buttons, lighted indicators, and clear identifying information on the button. It is noted that a front surface of at least the front face in the area of window 40 and also on the dark material 38 in the outer region has a surface finish and color that gives it a "dead front" appearance that hides the internal structure of the button 28 and switches 25, and that also help hide fingerprints and helps reduce glare and reflection.

Figure 8:
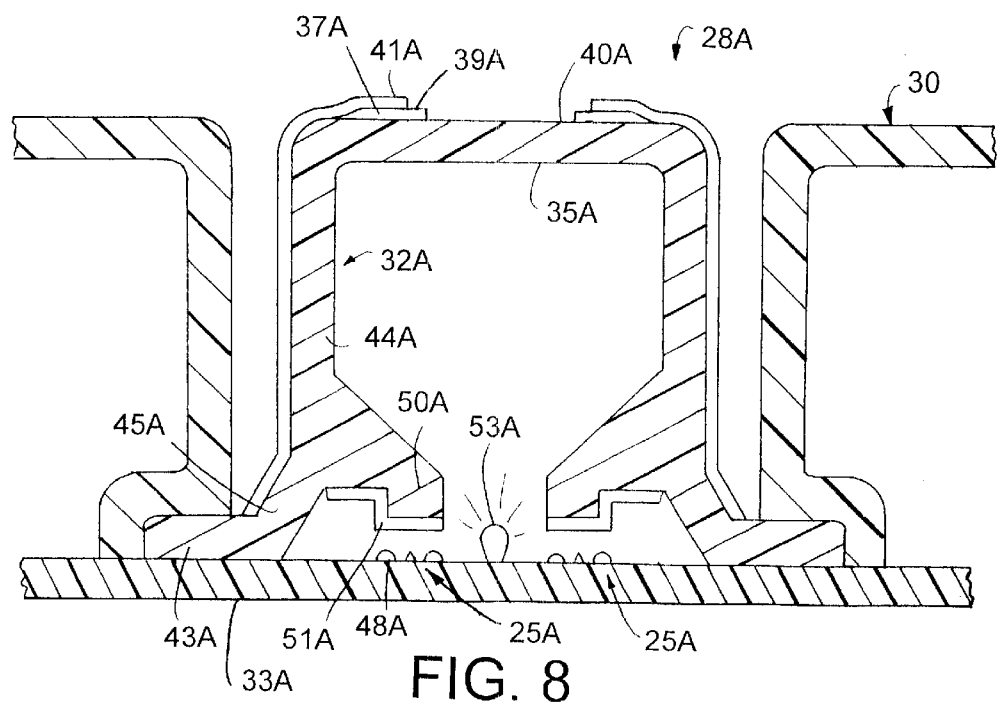
FIG. 8 is a cross sectional view similar to FIG. 4 of an alternative switch construction.

An alternative button 28A (FIG. 8) has the button face member (34) incorporated into the resilient member (32). In the button 28A, similar and identical components are identified by the same number but with the addition of the letter "A". This is done to reduce redundant discussion and not for other purposes.

The button 28A includes a front panel 35A integrally formed across a top of the resilient wall section 44A. The front panel 35A is sufficiently thick to be rigid enough for its intended purpose. The contrasting material 37A is applied to form window 40A, and to outline the window 40A with a border in a manner duplicating the symbol, and the dark material 41A is applied to cover outer regions of the button face, but to leave the border 39A. The switches 25A are formed similarly to the switches 25, and a light source 53A is similarly positioned. It is noted that the material forming the front panel 35A and wall sections 44A can be extended to form all of the buttons 28 on a single molded part, thus saving costs and improving assemble-ability.

The windows 40 and 40A can be manufactured in different ways. In a first way, the front panel 35 (or 35A) is covered with the contrasting white material 37 and the dark material 38. Then the dark material 38 is laser etched/burned off and removed back to a first perimeter, and the contrasting white material 37 is etched back to a second perimeter, the two perimeters defining the border 39 in the shape of a symbol around the window 40. In a second way, the materials 37 and 38 are screen-printed onto the substrate front panel 35 in a final shape as applied.

In the above discussion, three levels of energizing the light source 53 are discussed, which results in three levels of brightness of light. However, it is contemplated that the present invention includes energizing the light source 53 along a continuous "gray" scale of different brightnesses to compensate for changes in ambient brightness. The idea is to adjust the brightness so that it is easy to see and identify buttons without the buttons being objectionably brightly lit or objectionably dimly lit.

Figure 9:
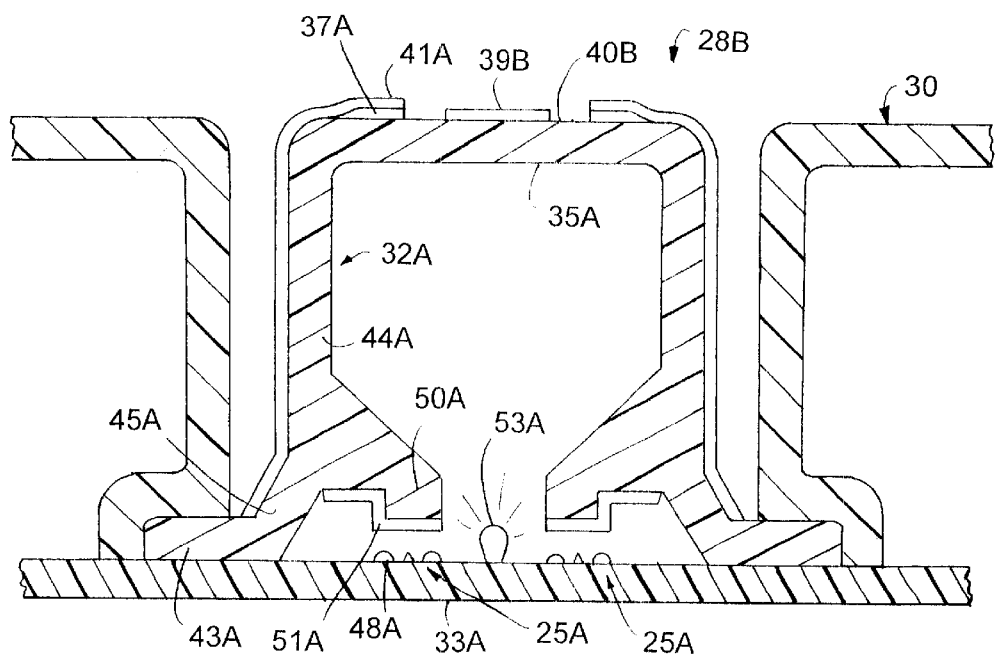
FIG. 9 is a cross section similar to FIG. 8, but showing a modified window area.

FIG. 9 discloses a modified button 28B where the highly visible material 39B forms an opaque picture in a center area on the front panel 35A, and the light-transmissive window 40B forms a perimeter or border region around the symbol-forming material 39B. The materials 39B and 41A are sufficiently close to create a contrast that assists in identifying the button 28B, both day and night, and also the area of window 40B assists in visual identification, particularly when light source 53A is energized and emits light. In a preferred form, the material 39B is amber or green because these colors have been found to create a surprisingly sharp contrast for optimal viewing while maintaining vehicle decor. However, other colors such as blue, fluorescent colors, and white can potentially be made to meet automobile manufacturer specifications, depending on the specific size and layouts of symbols on the buttons.

It is also contemplated that a scope of the present invention includes making the outer area 41A of a light-transmissive material, and that areas defined by 39B and 40B could be made of contrasting colors, such as amber and white, or amber and black, or white and black.

In the foregoing description, those skilled in the art will recognize that modifications may be made to the invention without departing from the concepts disclosed herein. Such modifications are to be considered as included in the following claims, unless these claims by their language expressly state otherwise.

The invention claimed is:

1. A mirror for a vehicle comprising
   a mirror housing;
   a reflector positioned in the mirror housing;
   an electrical circuit including a switch coupled to the mirror housing for activating and deactivating the electrical circuit;
   a sensor operably connected to the electrical circuit for sensing daylight and darkness;
   a compact display on a front of the mirror housing including a button coupled to the switch to actuate the switch, the button including a face having a symbol-defining center area, and further having marginal area around the window to define a border, and still further having outer material forming an outer region outside of the border, the center area and the marginal area both defining an identifying symbol for the button, one of the marginal area and the center area having an appearance in daylight that contrasts visibly and noticeably with the outer material, and the other of the marginal area and the center area forming a light-transmissive window; and
   a light source positioned to direct light toward the window;
   the electrical circuit being configured to automatically energize the light source to a first level to allow viewing and identification when in darkness and when the switch has de-activated the circuit, and further being configured to automatically energize the light source to a second level to allow viewing and identification when in darkness and when the switch has activated the circuit, and still further being configured to automatically energize the light source to a third level to allow viewing and identification when in daylight and when the switch has activated the circuit, and also the one of the border and the center area being sharply visible due to contrast to the outer material when in the daylight to allow viewing and identification of the button when the switch has de-activated the circuit.

2. The compact display defined in claim 1, wherein the button incorporates a resilient flexible base that operably supports the button for movement between a switch-depressed position for actuating the switch and a rest position.

3. In compact display for a mirror in a vehicle, the mirror having a mirror housing, a reflector positioned in the mirror housing, and an electrical circuit including a switch coupled to the mirror housing for activating and de-activating the electrical circuit, and a sensor operably connected to the electrical circuit for sensing daylight and darkness, the display comprising:
   a button coupled to the switch to actuate the switch, the button including a first material in a first area forming a symbol, a second material in a second area forming an outline around the symbol, and a third material in a third area outside of the outline, the third material contrasting visibly with one of the first and second materials for good viewing even at dusk, and the other of the first and second materials being light-transmitting to form a window;
   a light source positioned to direct light toward the window;
   the electrical circuit being configured to automatically energize the light source to a first level when in darkness and when the switch has de-activated the circuit, and further being configured to automatically energize the light source to a second level when in darkness and when the switch has activated the circuit, and still further being configured to automatically energize the light source to a third level when in daylight and when the switch has activated the circuit, and also the border being visible by contrast to at least one of the outer material and the window when in the daylight to identify the button when the switch has de-activated the circuit.

4. The compact display defined in claim 3, wherein the first material is translucent.

5. The compact display defined in claim 3, wherein the second material is translucent.

6. The compact display defined in claim 5, wherein the first material is one of green and amber in color.

7. The compact display defined in claim 3, wherein the button incorporates a resilient flexible base that operably supports the button for movement between a switch-depressed position for actuating the switch and a rest position.

8. A compact apparatus for a vehicle component comprising:
   a housing;
   a switch coupled to the housing;
   a button coupled to the switch to actuate the switch, the button including a face having a first material in a first region in the shape of a symbol, a second material forming a border around the symbol, and still further having a third material in an outer region outside of the border, the first and second materials both defining an identifying symbol for the button, one of the first, second and third materials having an appearance in daylight that contrasts visibly with at least one of the other two materials when the window is not lit, and at least one of the other two materials being translucent; and
   an automatically varied light source positioned in the housing to direct light toward the window, the light source being configured to provide light sufficient for viewing and identification when in darkness and when the switch has de-activated the circuit, and further being configured to provide light sufficient for viewing and identification when in darkness and when the switch has activated the circuit, and still further being configured to provide light sufficient for viewing and identification when in daylight and when the switch has activated the circuit, and also one of the first region and the border being visible when in the daylight to identify the button when the switch has de-activated the circuit.

9. The compact apparatus defined in claim 8, wherein one of the first, second, and third materials is amber in color.

10. The compact apparatus defined in claim 9, wherein the first material is amber.

11. The compact apparatus defined in claim 9, wherein the second material is amber.

12. The compact apparatus defined in claim 9, wherein the third material is one of green and amber.

13. The compact apparatus defined in claim 8, wherein the first material is translucent.

14. The compact apparatus defined in claim 8, wherein the second material is translucent.

15. The compact apparatus defined in claim 8, wherein the third material is translucent.

* * * * *